(12) United States Patent
Mayo et al.

(10) Patent No.: US 11,803,483 B2
(45) Date of Patent: *Oct. 31, 2023

(54) METADATA CACHE FOR STORING MANIFEST PORTION

(71) Applicant: Hewlett Packard Enterprise Development LP, Spring, TX (US)

(72) Inventors: Richard Phillip Mayo, Bristol (GB); David Malcolm Falkinder, Bristol (GB); Peter Thomas Camble, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/935,368

(22) Filed: Sep. 26, 2022

(65) Prior Publication Data
US 2023/0019871 A1   Jan. 19, 2023

Related U.S. Application Data

(63) Continuation of application No. 17/060,456, filed on Oct. 1, 2020, now Pat. No. 11,461,240.

(51) Int. Cl.
*G06F 12/121* (2016.01)
*G06F 12/02* (2006.01)
*G06F 12/0831* (2016.01)

(52) U.S. Cl.
CPC ........ *G06F 12/121* (2013.01); *G06F 12/0238* (2013.01); *G06F 12/0833* (2013.01); *G06F 2212/465* (2013.01); *G06F 2212/466* (2013.01)

(58) Field of Classification Search
CPC .............. G06F 12/121; G06F 12/0238; G06F 12/0833; G06F 2212/465; G06F 2212/466
See application file for complete search history.

(56) References Cited

U.S. PATENT DOCUMENTS 8,285,918 B2   10/2012   Maheshwari
8,566,519 B2   10/2013   Lay et al.
(Continued)

FOREIGN PATENT DOCUMENTS

CN   105404596 A   3/2016
CN   106708749 A   5/2017
(Continued)

OTHER PUBLICATIONS

Bender, M. A., et al., "An Introduction to Be-trees and Write-Optimization", Oct. 2015, 8 pages.
(Continued)

*Primary Examiner* — Michael Krofcheck
(74) *Attorney, Agent, or Firm* — Hewlett Packard Enterprise Patent Department

(57) ABSTRACT

Example implementations relate to storing manifest portions in a metadata cache. An example includes receiving, by a storage controller, a read request associated with a first data unit. In response to receiving the read request, the storage controller stores a manifest portion in a metadata cache, the stored manifest portion comprising a plurality of records, the plurality of records including a first record associated with the first data unit. The storage controller determines storage information of the first data unit using pointer information included in the first record of the stored manifest portion, and replaces the pointer information in the first record with the determined storage information of the first data unit.

20 Claims, 11 Drawing Sheets

(56) References Cited

U.S. PATENT DOCUMENTS

| | | | |
|---|---|---|---|
| 8,627,026 | B2 | 1/2014 | Domyo et al. |
| 8,719,488 | B2 | 5/2014 | Maheshwari |
| 9,514,054 | B2 | 12/2016 | Speer et al. |
| 9,753,854 | B1 | 9/2017 | Bao |
| 9,910,784 | B2 | 3/2018 | Maheshwari |
| 9,916,241 | B2 | 3/2018 | McKean et al. |
| 10,042,710 | B2 | 8/2018 | Mutalik et al. |
| 10,067,796 | B1 | 9/2018 | Metcalf |
| 9,977,746 | B2 | 10/2018 | Muppalaneni et al. |
| 10,169,365 | B2 | 1/2019 | Maheshwari |
| 10,216,638 | B2 | 2/2019 | Maheshwari et al. |
| 10,372,687 | B1 | 8/2019 | Armangau et al. |
| 10,402,394 | B2 | 9/2019 | Pendharkar et al. |
| 10,776,276 | B2 | 9/2020 | Shergill et al. |
| 11,030,107 | B2 | 6/2021 | Shergill et al. |
| 2011/0023027 | A1 | 1/2011 | Kegel et al. |
| 2011/0040732 | A1 | 2/2011 | Anglin et al. |
| 2011/0246503 | A1 | 10/2011 | Bender et al. |
| 2011/0283048 | A1 | 11/2011 | Feldman et al. |
| 2013/0304991 | A1 | 11/2013 | Boettcher et al. |
| 2013/0339319 | A1 | 12/2013 | Woodward et al. |
| 2014/0351388 | A1 | 11/2014 | Srinivasan et al. |
| 2015/0100717 | A1 | 4/2015 | Bennett et al. |
| 2015/0347477 | A1 | 12/2015 | Esmet et al. |
| 2015/0347547 | A1 | 12/2015 | Kasheff et al. |
| 2017/0212680 | A1 | 7/2017 | Waghulde |
| 2018/0011892 | A1 | 1/2018 | Kimura |
| 2018/0121362 | A1 | 5/2018 | Garg et al. |
| 2018/0150392 | A1 | 5/2018 | Booss et al. |
| 2018/0225315 | A1 | 8/2018 | Boles et al. |
| 2019/0095457 | A1 | 3/2019 | Gupta et al. |
| 2019/0095460 | A1 | 3/2019 | Wang et al. |
| 2019/0129970 | A1 | 5/2019 | Armangau et al. |
| 2019/0164612 | A1 | 5/2019 | Solanki et al. |
| 2019/0370239 | A1 | 12/2019 | Gupta et al. |
| 2020/0089617 | A1 | 3/2020 | Onishi et al. |
| 2020/0089788 | A1 | 3/2020 | Johnson et al. |
| 2020/0151268 | A1 | 5/2020 | Johnson et al. |
| 2020/0233801 | A1 | 7/2020 | Gupta et al. |
| 2020/0241784 | A1 | 7/2020 | Mayo et al. |
| 2020/0250148 | A1 | 8/2020 | Dayan et al. |
| 2020/0341889 | A1 | 10/2020 | Dreos et al. |
| 2020/0341909 | A1 | 10/2020 | Vanninen et al. |
| 2021/0034584 | A1 | 2/2021 | Dalmatov et al. |

FOREIGN PATENT DOCUMENTS

| | | |
|---|---|---|
| CN | 107193758 A | 9/2017 |
| WO | 2013/054588 A1 | 4/2013 |

OTHER PUBLICATIONS

Bradley C. Kuszmaul, "A Comparison of Fractal Trees to Log-Structured Merge (LSM) Trees," Apr. 22, 2014, White Paper, pp. 1-15, <http://www.pandademo.com/wp-content/uploads/2017/12/A-Comparison-of-Fractal-Trees-to-Log-Structured-Merge-LSM-Trees.pdf>.

Bradley C. Kuszmaul, "How Fractal Trees Work," Talk at CRIBB, Nov. 4, 2011, pp. 1-52.

Bradley C. Kuszmaul, "How TokuDB Fractal TreeTM Indexes Work," Guest Lecture in MIT 6.172 Performance Engineering, Nov. 18, 2010, 40 pages.

Callaghan, M., "Read, write & space amplification—pick 2", Nov. 23, 2015, 2 pages.

Dayan, N., "Optimal Bloom Filters and Adaptive Merging for LSM-Trees," ACM Transactions on Database Systems, vol. X, No. X, Article X. Publication date: Dec. 2018, p. 46.

Dayan, N., "The Log-Structured Merge-Bush & the Wacky Continuum," SIGMOD, Jun. 30, 2019, pp. 449-466.

Dayan, N., et al., "Dostoevsky: Better space-time trade-offs for LSM-tree based key-value stores via adaptive removal of superfluous merging", May 2018, 16 pages.

Dayan, N., et al., "Monkey: Optimal navigable key-value store", May 2017, 16 pages.

Flash Memory Summit; "Design Issues for SCM-friendly Data Structure"; Aug. 8, 2017; 26 pages.

Hellerstein, J. M., "Adaptive Query Processing: Technology in Evolution," IEEE Computer Society Technical Committee on Data Engineering, pp. 1-12.

Idreos, S, et. at, "Database Cracking," https://people.eecs.berkeley.edu/~kubitron/courses/cs262a/handouts/papers/cidr07p07.pdf, pp. 68-78.

Idreos, S, et. at, "Past and Future Steps for Adaptive Storage Data Systems: From Shallow to Deep Adaptivity," https://nivdayan_github_io/birte2016.pdf, pp. 10.

Jannen et al., "BetrFS: A Right-optimized Write-optimized File System", 13th USENIX Conference on File and Storage Technologies (FAST '15), Feb. 16-19, 2015, 16 pages.

Kaiyrakhmet, O. et al., "SLM-Db: Single-level Key-value Store with Persistent Memory", Feb. 25-28, 2019, 16 pages.

Lun, A.T.L. et al.; "S2 Text: Optimizing Hdf5 Chunk Cache Parameters"; Apr. 14, 2018; 3 pages.

Percona, "TokuDB Variables", printed on Dec. 16, 2019, 30 pages, webpage: https://www.percona.com/d.

Picorel et al., "Near-Memory Address Translation," 26th International Conference on Parallel Architectures and Compilation Techniques (PACT), 2017, pp. 303-317.

R. Chen, Z. Qin, Y. Wang, D. Liu, Z. Shao and Y. Guan, "On-Demand Block-Level Address Mapping in Large-Scale NAND Flash Storage Systems," in IEEE Transactions on Computers, vol. 64, No. 6, pp. 1729-1741, Jun. 1, 2015.

Ranganathan, S.; "Storage Class Memory: What's Next in Enterprise Storage"; Sep. 4, 2018; 13 pages.

Wu, X. et al., "LSM-TRIE: An LSM-tree-based Ultra-large Key-value Store for Small Data", Jul. 8-10, 2015, 13 pages.

METADATA CACHE FOR STORING MANIFEST PORTION

BACKGROUND

Data reduction techniques can be applied to reduce the amount of data stored in a storage system. An example data reduction technique includes data deduplication. Data deduplication identifies data units that are duplicative, and seeks to reduce or eliminate the number of instances of duplicative data units that are stored in the storage system.

BRIEF DESCRIPTION OF THE DRAWINGS

Some implementations are described with respect to the following figures.

Figure 1:
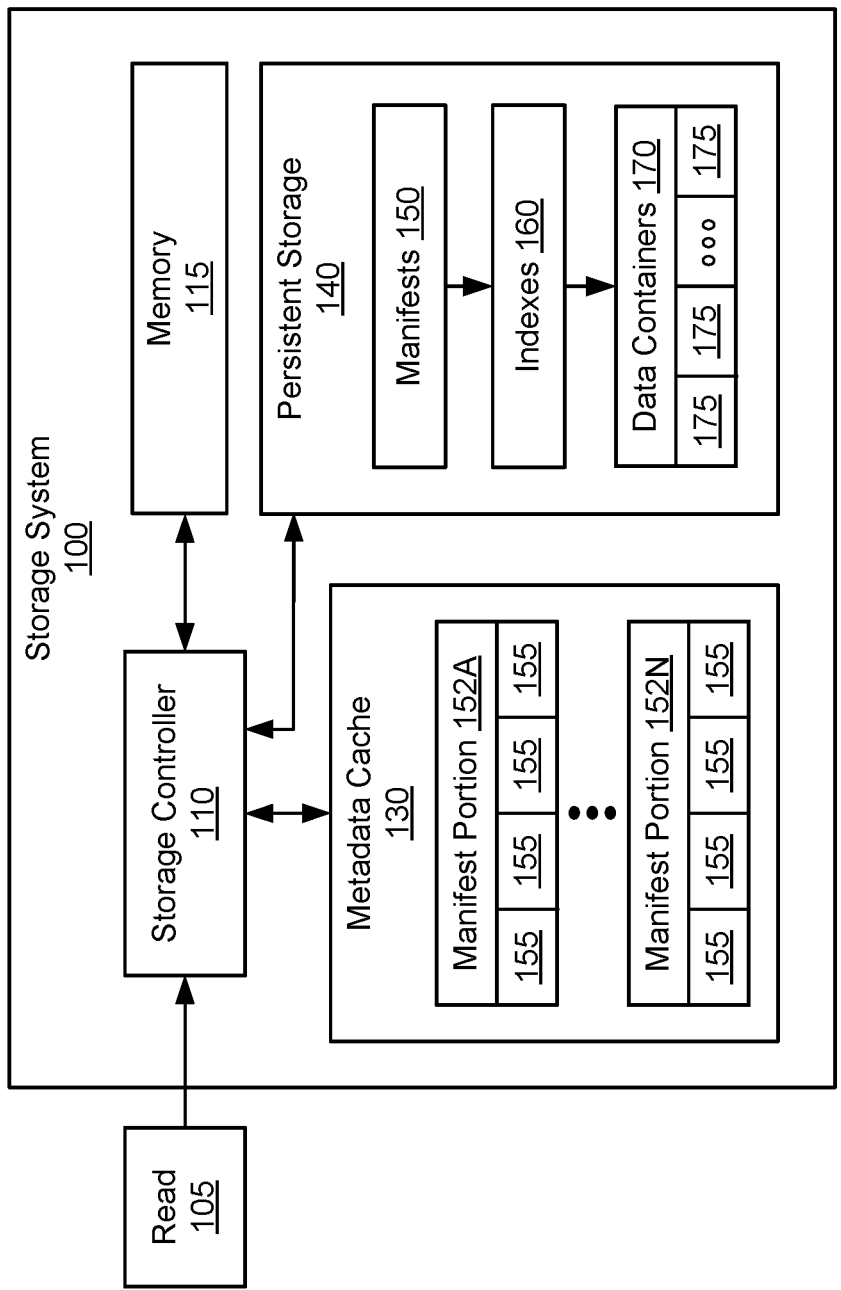
FIG. 1 is a schematic diagram of an example system, in accordance with some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, a storage system may deduplicate data to reduce the amount of space required to store the data. The storage system may perform a deduplication process including breaking a stream of data into discrete data units or "chunks." Further, the storage system may determine identifiers or "fingerprints" of incoming data units, and may determine which incoming data units are duplicates of previously stored data units. In the case of data units that are duplicates, the storage system may store references to the previous data units instead of storing the duplicate incoming data units.

As used herein, the term "fingerprint" refers to a value derived by applying a function on the content of the data unit (where the "content" can include the entirety or a subset of the content of the data unit). An example of the function that can be applied includes a hash function that produces a hash value based on the incoming data unit. Examples of hash functions include cryptographic hash functions such as the Secure Hash Algorithm 2 (SHA-2) hash functions, e.g., SHA-224, SHA-256, SHA-384, etc. In other examples, other types of hash functions or other types of fingerprint functions may be employed.

A "storage system" can include a storage device or an array of storage devices. A storage system may also include storage controller(s) that manage(s) access of the storage device(s). A "data unit" can refer to any portion of data that can be separately identified in the storage system. In some cases, a data unit can refer to a chunk, a collection of chunks, or any other portion of data. In some examples, a storage system may store data units in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof.

A "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

In some examples, a deduplication storage system may use stored metadata for processing and reconstructing the original data stream from the stored data units. In this manner, the deduplication process may avoid storing duplicate copies of repeated data units, and thereby may reduce the amount of space required to store the stream of data. In some examples, the deduplication metadata may include data recipes (also referred to herein as "manifests") that specify the order in which particular data units were received (e.g., in a data stream). In response to a read request, the deduplication system may use a manifest to determine the received order of data units, and thereby recreate the original data stream. The manifest may include a sequence of records, with each record representing a particular set of data unit(s). The records of the manifest may include one or more fields (also referred to herein as "pointer information") that identify indexes that include storage information for the data units. For example, the storage information may include one or more index fields that specify location information (e.g., containers, offsets, etc.) for the stored data units, compression and/or encryption characteristics of the stored data units, and so forth. In some examples, the manifests and indexes may each be read in addressable portions of fixed sizes (e.g., 4 KB portions). Further, the locations of multiple data units represented by one manifest portion may be identified in multiple index portions. Therefore, recreating the original sequence of data units may include loading the manifest portion into memory, and then loading multiple index portions into memory to access those data units.

In some examples, the deduplication system may cache at least some of the metadata in order to improve performance during some read operations. For example, storing a manifest portion in a cache may reduce the time required to identify and access the data units represented by that manifest portion. Further, caching a manifest portion may be particularly useful when the data being read is a continuous sequence of data units that are represented in that manifest portion. In contrast, storing a particular manifest portion in a cache may provide little or no benefit if the data units have to be read in non-continuous fashion across multiple manifest portions. Furthermore, because reading the data units represented by one manifest portion may require using multiple index portions, and because each index portion may be read and addressed as an entire unit of fixed size, it may not be possible or efficient to attempt to also cache the multiple index portions required to access the chunks represented by the manifest portion.

In accordance with some implementations of the present disclosure, a deduplication storage system may cache a manifest portion in response to a read request for a data unit represented by a record of the manifest portion. The deduplication system may use pointer information included in the record to identify an index associated with the data unit, and may read storage information of the data unit from the identified index. In some implementations, the deduplication system may replace the pointer information of the record with the storage information of the data unit. In this manner, the record of the cached manifest portion may be modified or "resolved" to include all information needed to access the data unit during subsequent reads (i.e., without having to read that index again). Further, during subsequent read operations of other data units, the deduplication system may opportunistically resolve other records of the cached manifest portion. Accordingly, implementations described herein may allow caching of a manifest portion, but without having to also cache multiple index portions that are associated with the manifest portion. In this manner, implementations may provide improved performance of the deduplication system while using a limited amount of cache memory.

FIG. 1 shows an example of a storage system 100 that includes a storage controller 110, memory 115, a metadata cache 130, and persistent storage 140, in accordance with some implementations. As shown, the persistent storage 140 may include any number of manifests 150, indexes 160, and data containers 170. The persistent storage 140 may include one or more non-transitory storage media such as hard disk drives (HDDs), solid state drives (SSDs), optical disks, and so forth, or a combination thereof. The memory 115 and/or the metadata cache 130 may be implemented in semiconductor memory such as random access memory (RAM).

In some implementations, the storage system 100 may perform deduplication of stored data. For example, the storage controller 110 may divide a stream of input data into data units, and may store at least one copy of each data unit in a data container 170 (e.g., by appending the data units to the end of the container 170). In some examples, each data container 170 may be divided into entities 175, where each entity 175 includes multiple stored data units.

In one or more implementations, the storage controller 110 may generate a fingerprint for each data unit. For example, the fingerprint may include a full or partial hash value based on the data unit. To determine whether an incoming data unit is a duplicate of a stored data unit, the storage controller 110 may compare the fingerprint generated for the incoming data unit to the fingerprints of the stored data units. If this comparison results in a match, then the storage controller 110 may determine that a duplicate of the incoming data unit is already stored by the storage system 100.

In some implementations, the storage controller 110 may generate a manifest 150 to record the order in which the data units were received. Further, the manifest 150 may include a pointer or other information indicating the index 160 that is associated with each data unit. In some implementations, the associated index 160 may indicate the location in which the data unit is stored. For example, the associated index 160 may include information specifying that the data unit is stored at a particular offset in an entity 175, and that the entity 175 is stored at a particular offset in a data container 170.

In some implementations, the storage controller 110 may receive a read request 105 to access the stored data, and in response may access the manifest 150 to determine the sequence of data units that made up the original data. The storage controller 110 may then use pointer data included in the manifest 150 to identify the indexes 160 associated with the data units. Further, the storage controller 110 may use information included in the identified indexes 160 to determine the locations that store the data units (e.g., data container 170, entity 175, offsets, etc.), and may then read the data units from the determined locations.

As shown, the storage system 100 may use the metadata cache 130 to store at least some metadata associated with data deduplication. For example, as shown in FIG. 1, the metadata cache 130 may store any number of manifest portions 152A-152N (also referred to as "manifest portions 152"). Each manifest portion 152 may include multiple manifest records 155, where each manifest record 155 is associated with a particular data unit. In some examples, caching metadata in the metadata cache 130 may reduce the frequency and amount of metadata that has to be read from the persistent storage 140, and may thereby provide improved performance of the storage system 100.

Figure 2:
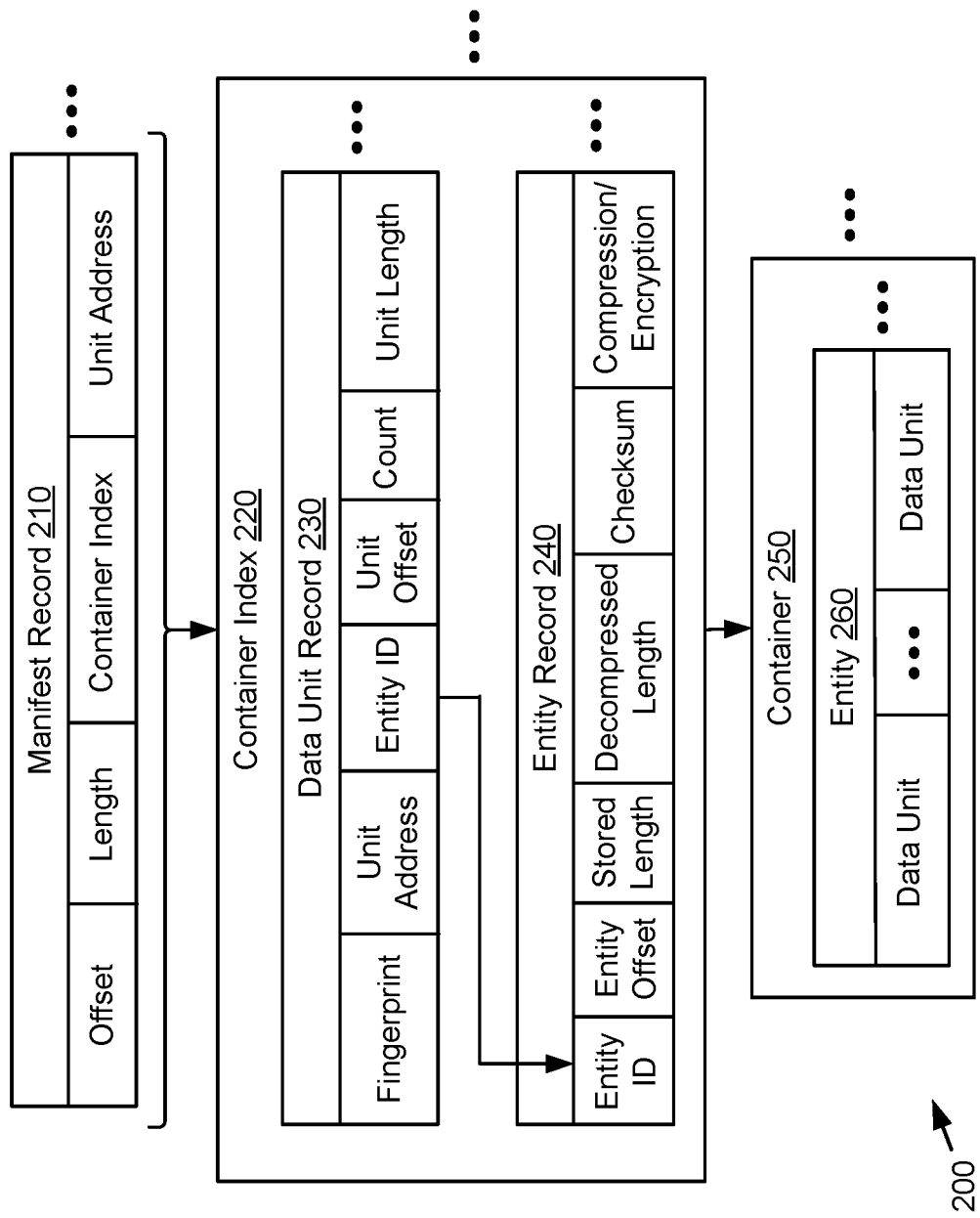
FIG. 2 is an illustration of example data structures, in accordance with some implementations.

Referring now to FIG. 2, shown is an illustration of example data structures 200 used in deduplication, in accordance with some implementations. As shown, the data structures 200 may include a manifest record 210, a container index 220, a container 250, and an entity 260. In some examples, the manifest record 210, the container index 220, the container 250, and the entity 230 may correspond generally to example implementations of a manifest record 155, an index 160, a data container 170, and an entity 175 (shown in FIG. 1), respectively. In some examples, the data structures 200 may be generated and/or managed by the storage controller 110 (shown in FIG. 1).

As shown in FIG. 2, in some examples, the manifest record 210 may include various fields, such as offset, length, container index, and unit address. In some implementations, each container index 220 may include any number of data unit record(s) 230 and entity record(s) 240. Each data unit record 230 may include various fields, such as a fingerprint (e.g., a hash of the data unit), a unit address, an entity identifier, a unit offset (i.e., an offset of the data unit within the entity), a count value, and a unit length. Further, each entity record 240 may include various fields, such as an entity identifier, an entity offset (i.e., an offset of the entity within the container), a stored length (i.e., a length of the data unit within the entity), a decompressed length, a checksum value, and compression/encryption information (e.g., type of compression, type of encryption, and so forth). In some implementations, each container 250 may include any number of entities 260, and each entity 260 may include any number of stored data units.

In one or more implementations, the data structures 200 may be used to retrieve stored deduplicated data. For example, a read request may specify an offset and length of data in a given file. These request parameters may be matched to the offset and length fields of a particular manifest record 210. The container index and unit address of the particular manifest record 210 may then be matched to a particular data unit record 230 included in a container index 220. Further, the entity identifier of the particular data unit record 230 may be matched to the entity identifier of a particular entity record 240. Furthermore, one or more other fields of the particular entity record 240 (e.g., the entity offset, the stored length, checksum, etc.) may be used to identity the container 250 and entity 260, and the data unit may then be read from the identified container 250 and entity 260.

Referring now to FIGS. 1-2, in some examples, using the data structures 200 to retrieve stored deduplicated data may include reading manifest portions and the associated index portions from persistent storage 140, and loading these metadata portions into memory 115. Further, in order to reduce the time and performance cost of reading from persistent storage, some metadata may be stored in the metadata cache 130. Such caching of metadata may be particularly useful for "sequential reads," which involve reading relatively large sequences of data units that are continuous in a manifest and/or container location. However, such caching of metadata may provide little or no benefit for "random reads," which involve reading relatively small sets of data units that are not continuous in a manifest and/or container location. In particular, performing random reads may require using a relatively large number of index portions, and it may not be possible or efficient to load this large number of index portions in a metadata cache.

In one or more implementations, the metadata cache 130 may be used in different operating modes that are adapted to different types of read requests. For example, the operating modes of the metadata cache 130 may include a first operating mode that is adapted to sequential reads, and a second operating mode that is adapted to random reads. In some implementations, the operating mode of the metadata cache 130 may be selected based on characteristics of recent read operations. For example, the storage controller 110 may cause the metadata cache 130 to use a first operating mode in response to a determination that the majority of recent read requests are sequential reads. Further, the storage controller 110 may cause the metadata cache 130 to use a second operating mode in response to a determination that the majority of recent read requests are random reads.

Figure 3A:
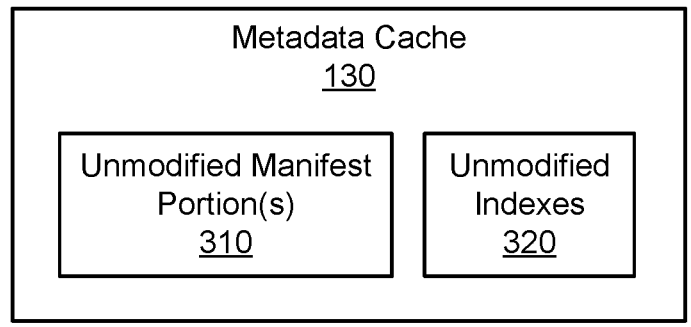
FIGS. 3A-3B are illustrations of example data structures, in accordance with some implementations.

In one or more implementations, the metadata cache 130 may store different types of metadata when used in the different operating modes. For example, referring now to FIG. 3A, shown is an illustration of the metadata cache 130 in the first operating mode (i.e., adapted for sequential reads). As shown in FIG. 3A, when using the first operating mode, the metadata cache 130 may store manifest portion(s) 310 and associated indexes 320 in unmodified form (i.e., having the same content and structure as the corresponding metadata elements that are stored in the persistent storage 140).

Figure 3B:
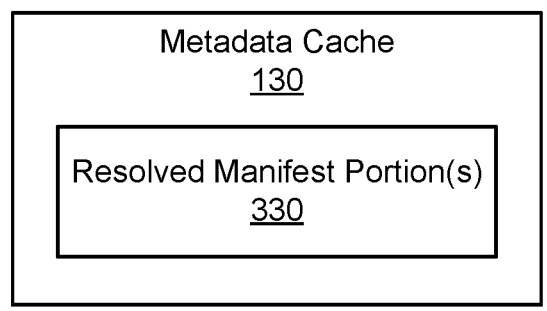

Referring now to FIG. 3B, shown is an illustration of the metadata cache 130 in the second operating mode (i.e., adapted for random reads). As shown in FIG. 3B, when using the second operating mode, the metadata cache 130 may store only resolved manifest portion(s) 330. As used herein, a "resolved manifest portion" refers to a manifest portion that includes at least one resolved entry. Further, as used herein, a "resolved entry" refers to a manifest entry in which the information that identifies a corresponding index is replaced with data unit storage information from the corresponding index. In some examples, each resolved entry of the resolved manifest portion 330 may include all information needed to access a particular data unit associated with the entry.

Figure 4:
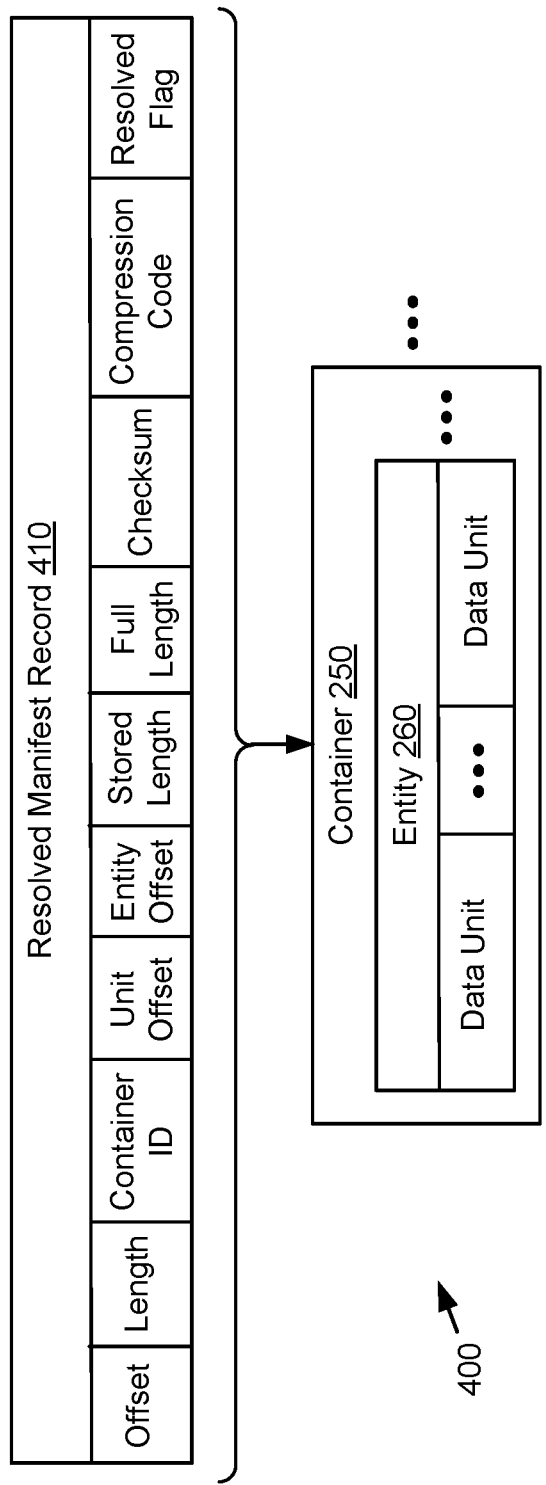
FIG. 4 is illustration of example data structures, in accordance with some implementations.

Referring now to FIG. 4, shown is a resolved manifest record 410 in accordance with some implementations. In some examples, the resolved manifest record 410 may correspond generally to a resolved record of the resolved manifest portion 330 (shown in FIG. 3B). In some examples, the resolved manifest record 410 may be generated and/or managed by the storage controller 110 (shown in FIG. 1).

In one or more implementations, the resolved manifest record 410 may be generated by modifying a source manifest record (e.g., manifest record 210 shown in FIG. 2) such that pointer information of the record is replaced with storage information of the data unit. As used herein, the term "pointer information of the manifest record" may refer to the container index field and the unit address field of the manifest record 220. For example, referring to FIGS. 2 and 4, the resolved manifest record 410 may include the offset field and the length field from the manifest record 220. However, in the resolved manifest record 410, the pointer information (e.g., the container index field and the unit address field) of the manifest record 220 may be replaced with fields copied from an associated index. For example, the resolved manifest record 410 may include the unit offset field from a data unit record 230, and may also include an entity offset, a stored length, a decompressed length field, a checksum value, and compression/encryption information from an entity record 240. As used herein, the term "storage information of the data unit" may refer to the unit offset field from the data unit record 230, and the entity offset, stored length, decompressed length field, checksum value, and compression/encryption information from the entity record 240.

In some implementations, the resolved manifest record 410 may include all information needed to identify the container 250 and entity 260 that stores a particular data unit. In this manner, the resolved manifest record 410 may be used to access the data unit without having to access a container index associated with the data unit. As shown, the resolved manifest record 410 may also include a resolved flag that indicates whether the manifest record has been resolved. This resolved flag is described further below with reference to FIGS. 5A-5B.

Figure 5A:
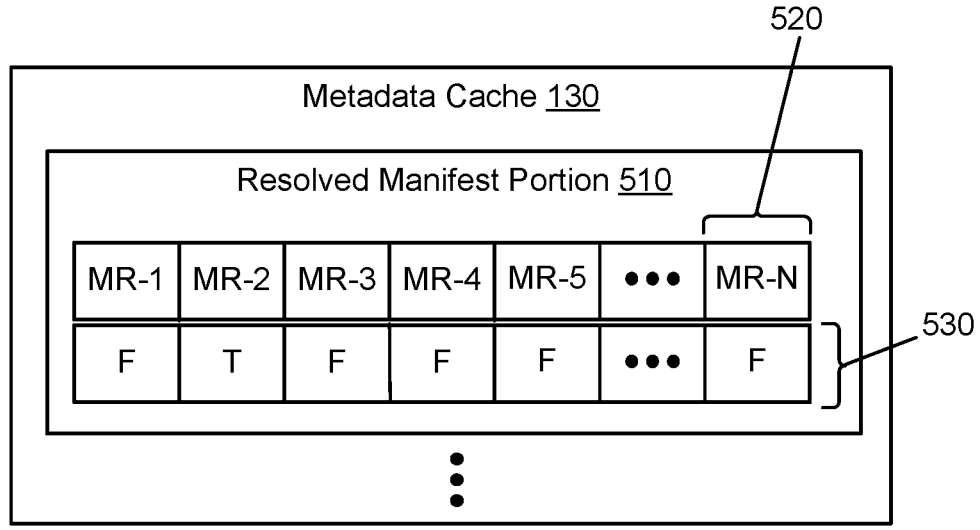
FIGS. 5A-5B is an illustration of an example data structures, in accordance with some implementations.

Referring now to FIG. 5A, shown is an illustration of an example metadata cache 130 storing a resolved manifest portion 510 at a first point in time. The resolved manifest portion 510 may correspond generally to an example of the resolved manifest portion 330 (shown in FIG. 3B). As shown in FIG. 5A, the resolved manifest portion 510 includes any number of manifest records MR 520, where each manifest record 520 is associated with a resolved flag 530. In particular, the resolved manifest portion 510 includes the manifest record "MR-2" that is resolved, and therefore is associated with a resolved flag 530 set to true (T). Further, the resolved manifest portion 510 also includes multiple unresolved manifest records that are associated with resolved flags 530 set to false (F).

In some implementations, the resolved manifest portion 510 may be generated and stored in the metadata cache 130 upon receiving a read request, where the read request involves a particular data unit that is associated with the record MR-2. In response to this read request, the unmodified manifest portion (e.g., manifest record 210 shown in FIG. 2) that includes the record MR-2 may be identified. Further, pointer information included in the record MR-2 may be used to identify an associated index (e.g., container index 220 shown in FIG. 2), and the associated index may be used to obtain storage information associated with the particular data unit. In some implementations, the manifest portion 510 may be stored in the metadata cache 130, and the record MR-2 may be modified or "resolved" such that the pointer information is replaced with the storage information obtained from the index. Further, the resolved flag 530 associated with the record MR-2 may be set to "T," thereby indicating that the record MR-2 is now resolved.

Figure 5B:
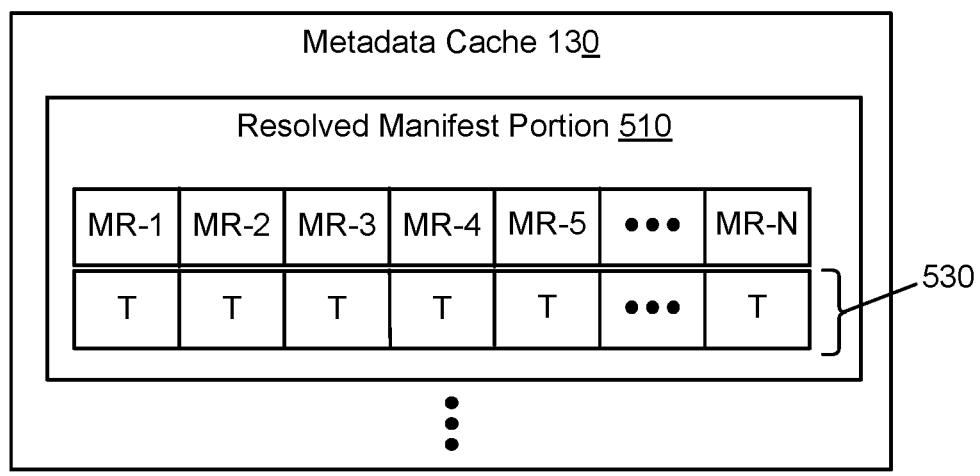

Referring now to FIG. 5B, shown is an illustration of the metadata cache 130 storing the resolved manifest portion 510 at a second point in time. As shown, at the second point in time, the resolved flags 530 of each record 520 is set to "T," thereby indicating that all records 520 have been resolved. In some examples, each of the records 520 that were unresolved at the first point in time (illustrated in FIG. 5A) may have been opportunistically resolved based on subsequent read requests (i.e., after the read request that caused the resolved manifest portion 510 to be initially stored in the metadata cache 130).

In some implementations, two or more records of the resolved manifest portion 510 may be consolidated into a single record. For example, if two records are adjacent within the resolved manifest portion 510 (e.g., adjacent records MR-1 and MR-2), and if the storage locations of the corresponding data units are also adjacent (e.g., the data units associated with MR-1 and MR-2 are stored in adjacent container locations), then the storage controller 110 may consolidate these adjacent records into a single record of the resolved manifest portion 510. Further, the consolidated record may include storage information that indicates the continuous storage location of the adjacent data units. In some examples, this storage location may be specified as offset and length values.

In some implementations, the unresolved records of the manifest portion 510 (e.g., record MR-1) may be opportunistically resolved based on subsequent reads (i.e., after the read that caused the manifest portion 510 to be stored in the metadata cache 130). For example, if the record MR-1 of the cached manifest portion 510 is used to access a second data unit (e.g., by accessing a second index and determining storage information of the second unit), the record MR-1 may then be resolved by replacing its pointer information with the storage information of the second data unit (obtained from the second index).

In another example, assume that record MR-3 includes pointer information that identifies a data unit record in a third index. Assume further that another manifest portion (not shown) includes a different record that includes the same pointer information. If that different record of another manifest portion is then used to access a third data unit (e.g., in response to a different read request), then the record MR-3 may be opportunistically resolved by replacing its pointer information with the storage information of the third data unit. In some implementations, the metadata cache 130 may store a data structure (not shown in FIGS. 5A-5B) that identifies the unresolved records of stored manifest portions 510 and the indexes (e.g., container indexes) associated with those unresolved records. This data structure may be used to determine whether any records can be opportunistically resolved when an associated index has been loaded into memory.

In some implementations, the manifest portion 510 may remain in the metadata cache 130 according to one or more replacements policies. For example, the metadata cache 130 may use a data structure (not shown) to track the most recent time that each manifest portion 510 has been used to complete a read operation, and may evict a manifest portion 510 that is least recently used (LRU). In some examples, a first manifest portion 510 that is opportunistically resolved based on a read of another manifest portion 510 is not counted as the most recent use of the first manifest portion 510 for purposes of LRU tracking and eviction.

Figure 6A:
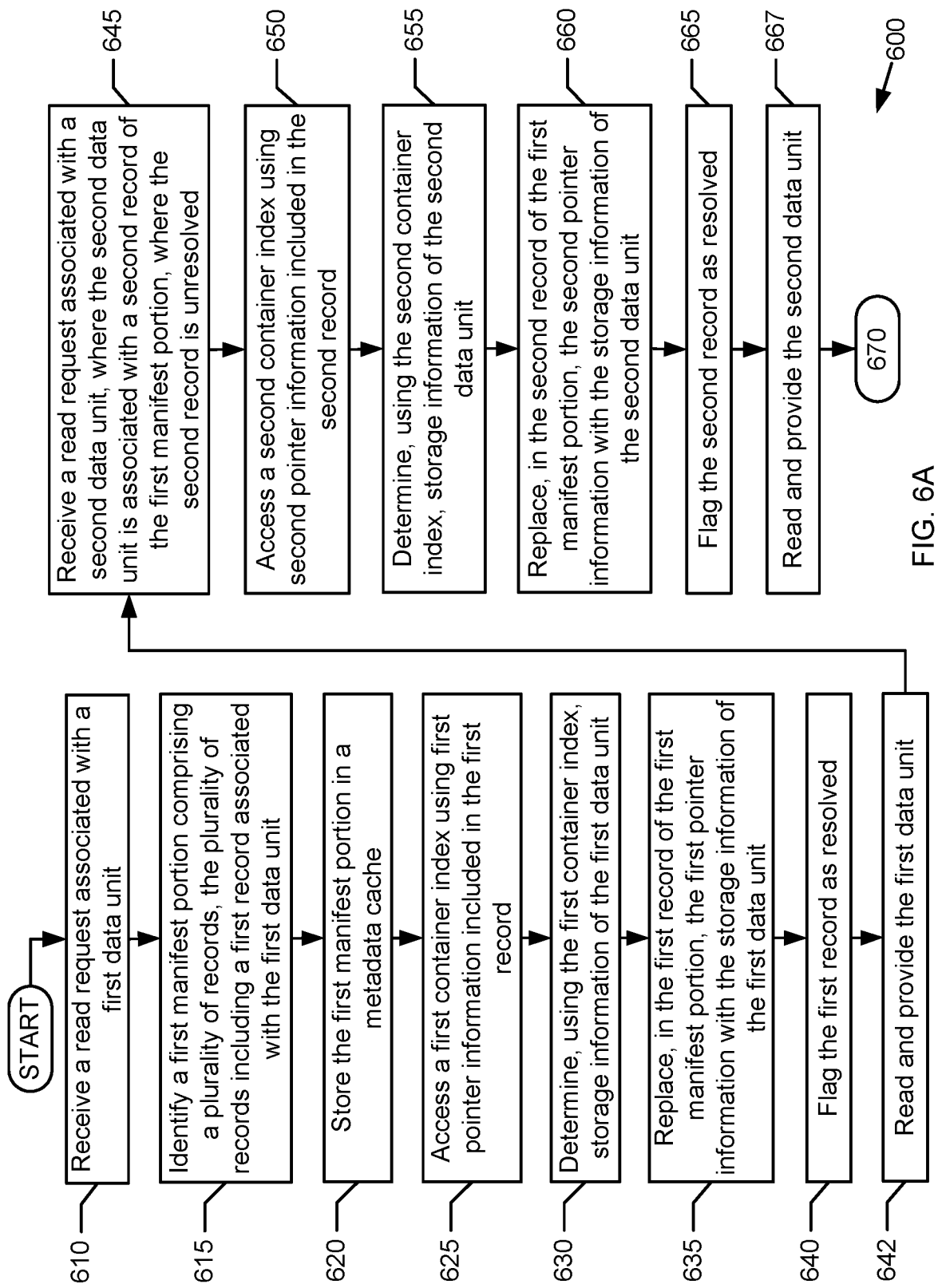
FIGS. 6A-6B are illustrations of an example process, in accordance with some implementations.
Figure 6B:
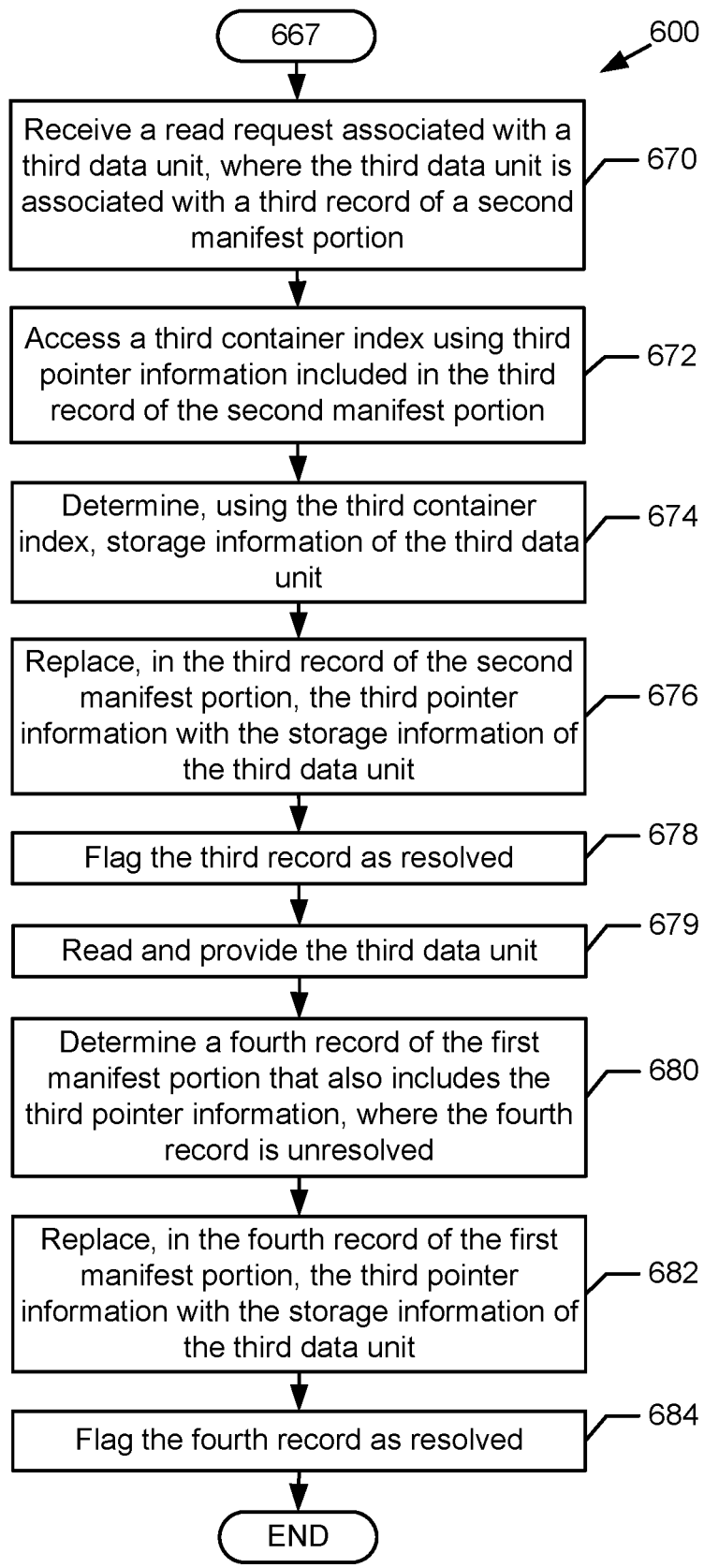

Referring now to FIGS. 6A-6B, shown is an example process 600, in accordance with some implementations. In some examples, the process 600 may be performed using the storage controller 110 (shown in FIG. 1). The process 600 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 600 may be described below with reference to FIGS. 1-5B, which show examples in accordance with some implementations. However, other implementations are also possible.

Referring now to FIG. 6A, block 610 may include receiving a read request associated with a first data unit. Block 615 may include identifying a first manifest portion comprising a plurality of records, where the plurality of records includes a first record associated with the first data unit. Block 620 may include storing the first manifest portion in a metadata cache. Block 625 may include accessing a first container index using first pointer information included in the first record. For example, referring to FIGS. 1-2, the storage controller 110 may receive a read request 105 that specifies an offset and length. The offset and length may identify or be associated with a data unit or portion included in a stored data file. The storage controller 110 may use the offset and length to identify a record 155 of a first manifest portion 152. The storage controller 110 may cause an entirety of the first manifest portion 152 to be stored in a metadata cache 130. Further, the storage controller 110 may identify a container index 220 that matches the pointer information of the first record 210, and may thereby access information included in the identified container index 220. For example, referring to FIG. 2, the pointer information of the first record 210 may include the container index field and unit address field.

Referring again to FIG. 6A, block 630 may include determining, using the first container index, storage information of the first data unit. Block 635 may include replacing, in the first record of the first manifest portion, the first pointer information with the storage information of the first data unit. Block 640 may include flagging the first record as resolved. Block 642 may include reading and providing the first data unit (i.e., as a response to the read request). For example, referring to FIGS. 1-5A, the storage controller 110 may read storage information included in the identified container index 220 (e.g., unit offset field from the data unit record 230, and entity offset, stored length, decompressed length field, checksum value, and compression/encryption information from the entity record 240). Further, the storage controller 110 may modify the first record 210 by replacing the pointer information with the storage information read from the container index 220, and by setting the associated resolved flag 530 (shown in FIG. 5A) to true ("T"). In some examples, after completing the modifications, the resolved first record 210 may have the same form as the resolved manifest record 410 shown in FIG. 4. The storage controller 110 may use the storage information to read the first data unit from the persistent storage 140, and may provide the first data unit as a result to the read request (received at block 610). In some examples, the first data unit may be one of multiple data units that are provided as the result of the read request.

Referring again to FIG. 6A, block 645 may include receiving a read request associated with a second data unit, where the second data unit is associated with a second record of the first manifest portion, where the second record is unresolved. Block 650 may include accessing a second container index using second pointer information included in the second record. For example, referring to FIGS. 1-2, the storage controller 110 may receive a second read request, and in response may identify a second record of the first manifest portion 152 (i.e., different from the first record discussed above with reference to block 615). The storage controller 110 may read second pointer information included in the second record, and may identify a second container index 220 that matches the second pointer information.

Referring again to FIG. 6A, block 655 may include determining, using the second container index, storage information of the second data unit. Block 660 may include replacing, in the second record of the first manifest portion, the second pointer information with the storage information of the second data unit. Block 665 may include flagging the second record as resolved. Block 667 may include reading and providing the second data unit (i.e., as a response to the read request). For example, referring to FIGS. 1-5A, the storage controller 110 may read storage information included in the second container index 220. Further the storage controller 110 may modify the second record 155 of the first manifest portion 152 by replacing the pointer information with the storage information read from the second container index 220, and by setting the associated resolved flag 530 (shown in FIG. 5A) to true ("T"). The storage controller 110 may use the storage information to read the second data unit from the persistent storage 140, and may provide the second data unit as a result to the read request (received at block 645). In some examples, the second data unit may be one of multiple data units that are provided as the result of the read request. After block 667, the process 600 may continue at block 670 (shown in FIG. 6B).

Referring now to FIG. 6B, block 670 may include receiving a read request associated with a third data unit, where the third data unit is associated with a third record of a second manifest portion. Block 672 may include accessing a third container index using third pointer information included in the third record of the second manifest portion. For example, referring to FIGS. 1-2, the storage controller 110 may receive a third read request, and in response may identify a third record 155 of a second manifest portion 152 (i.e., different from the manifest portion discussed above with reference to blocks 615 and 645). If the second manifest portion 152 is not already included in the metadata cache 130, the storage controller 110 may store the second manifest portion 152 in the metadata cache 130. Further, the storage controller 110 may read third pointer information included in the third record 155, and may identify a third container index 220 that matches the third pointer information.

Referring again to FIG. 6B, block 674 may include determining, using the third container index, storage information of the third data unit. Block 676 may include replacing, in the third record of the second manifest portion, the third pointer information with the storage information of the third data unit. Block 678 may include flagging the third record as resolved. Block 679 may include reading and providing the third data unit (i.e., as a response to the read request). For example, referring to FIGS. 1-5A, the storage controller 110 may read storage information included in the third container index 220. Further the storage controller 110 may modify the third record 155 by replacing the pointer information with the storage information read from the third container index 220, and by setting the associated resolved flag 530 (shown in FIG. 5A) to true ("T"). The storage controller 110 may use the storage information to read the third data unit from the persistent storage 140, and may provide the third data unit as a result to the read request (received at block 670). In some examples, the second data unit may be one of multiple data units that are provided as the result of the read request.

Referring again to FIG. 6B, block 680 may include determining a fourth record of the first manifest portion that also includes the third pointer information, where the fourth record is unresolved. Block 682 may include replacing, in the fourth record of the first manifest portion, the third pointer information with the storage information of the third data unit. Block 684 may include flagging the fourth record as resolved. For example, referring to FIGS. 1-5A, the storage controller 110 may read storage information included in the third container index 220. Further the storage controller 110 may modify the third record 155 by replacing the pointer information with the storage information read from the third container index 220, and by setting the associated resolved flag 530 (shown in FIG. 5A) to true ("T"). After block 684, the process 600 may be completed.

Figure 7:
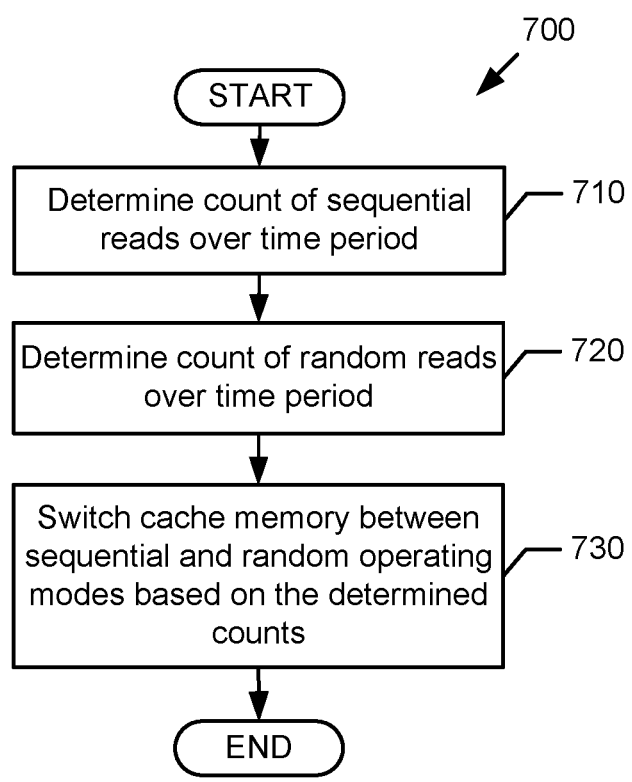
FIG. 7 is an illustration of an example process, in accordance with some implementations.

Referring now to FIG. 7, shown is an example process 700, in accordance with some implementations. In some examples, the process 700 may be performed using the storage controller 110 (shown in FIG. 1). The process 700 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 700 may be described below with reference to FIGS. 1-5B, which show examples in accordance with some implementations. However, other implementations are also possible.

Block 710 may include determining a count of sequential reads over a time period. Block 720 may include determining a count of random reads over the time period. Block 730 may include switching a cache memory between sequential and random operating modes based on the determined counts. For example, referring to FIGS. 1-5A, the storage controller 110 may count the number of sequential reads (e.g., reads for continuous blocks of data that are larger than a specified size) that occur during a predefined time period (e.g., one minute). The storage controller 110 may also count the number of random reads (e.g., reads for non-continuous blocks of data that are smaller than a given size) that occur during the time period. Further, the storage controller 110 may determine whether the ratio between random reads and sequential reads exceeds a threshold, and may select between first and second operating modes for the metadata cache 130. For example, the first operating mode may be used if sequential reads are more common than random reads, while the second operating mode may be used otherwise. After block 730, the process 700 may be completed. In some examples, a sequential operating mode includes storing unmodified manifest portions in the cache memory, and a random operating mode includes storing only resolved manifest portions in the cache memory.

Figure 8:
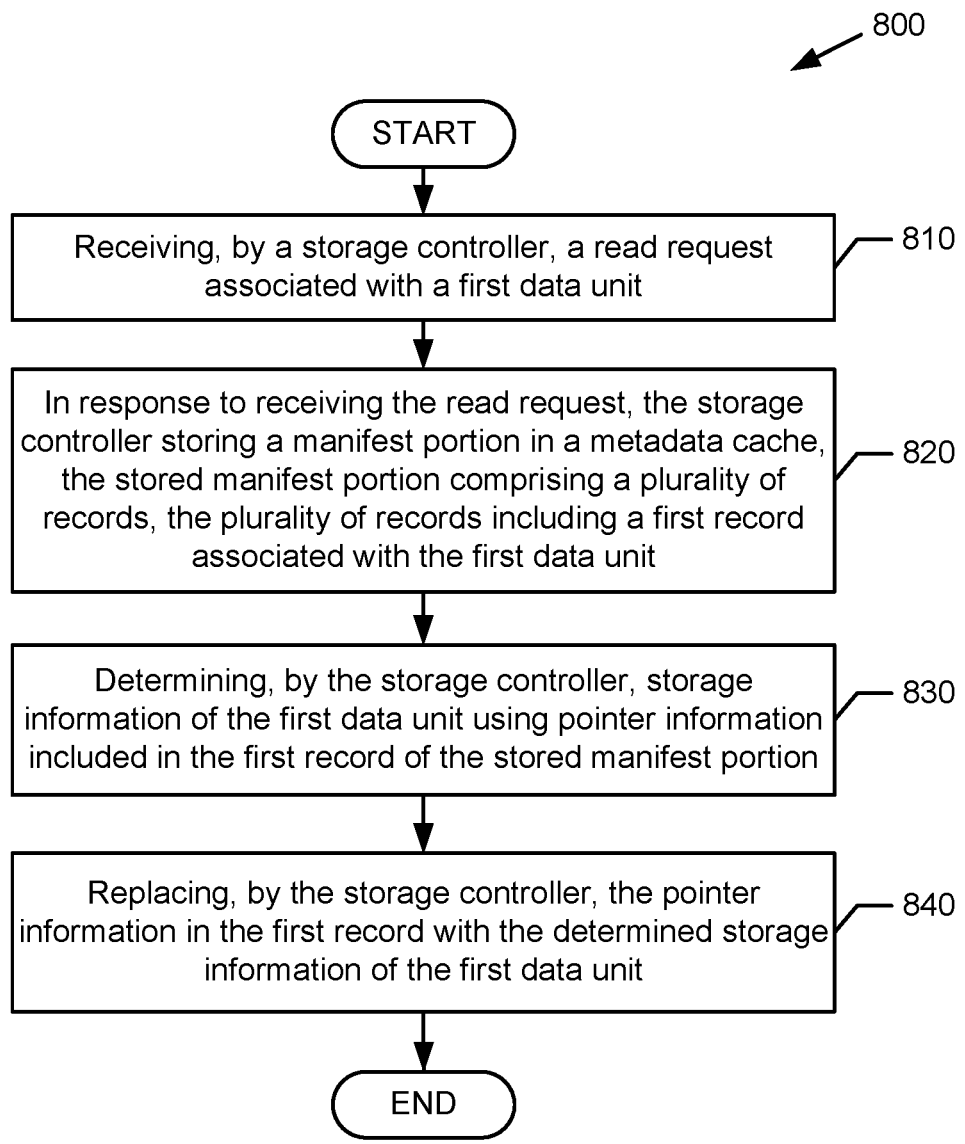
FIG. 8 is an illustration of an example process, in accordance with some implementations.

Referring now to FIG. 8, shown is an example process 800, in accordance with some implementations. In some examples, the process 800 may be performed using the storage controller 110 (shown in FIG. 1). The process 800 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 800 may be described below with reference to FIGS. 1-5B, which show examples in accordance with some implementations. However, other implementations are also possible.

Block 810 may include receiving, by a storage controller, a read request associated with a first data unit. Block 820 may include, in response to receiving the read request, the storage controller storing a manifest portion in a metadata cache, the stored manifest portion comprising a plurality of records, the plurality of records including a first record associated with the first data unit. For example, referring to FIGS. 1-2, the storage controller 110 may receive a read request 105 associated with a first data unit, and in response may identify a manifest portion 152 that includes a first record 210 associated with the first data unit. The storage controller 110 may cause the identified manifest portion 152 to be stored in the metadata cache 130. In some examples, the manifest portion 152 is cached as an entire unit of a fixed size (e.g., a predetermined number of manifest records).

Referring again to FIG. 8, block 830 may include determining, by the storage controller, storage information of the first data unit using pointer information included in the first record of the stored manifest portion. Block 840 may include replacing in the first record, by the storage controller, the pointer information with the storage information of the first data unit. For example, referring to FIGS. 1-5A, the storage controller 110 may identify a container index 220 that matches the pointer information of the first record 210, and may then access information included in the identified container index 220. The storage controller 110 may read storage information included in the identified container index 220 (e.g., unit offset field from the data unit record 230, and entity offset, stored length, decompressed length field, checksum value, and compression/encryption information from the entity record 240). Further, the storage controller 110 may modify the first record 210 by replacing the pointer information with the storage information read from the container index 220, and by setting the associated resolved flag 530 (shown in FIG. 5A) to true ("T"). After block 840, the process 800 may be completed.

Figure 9:
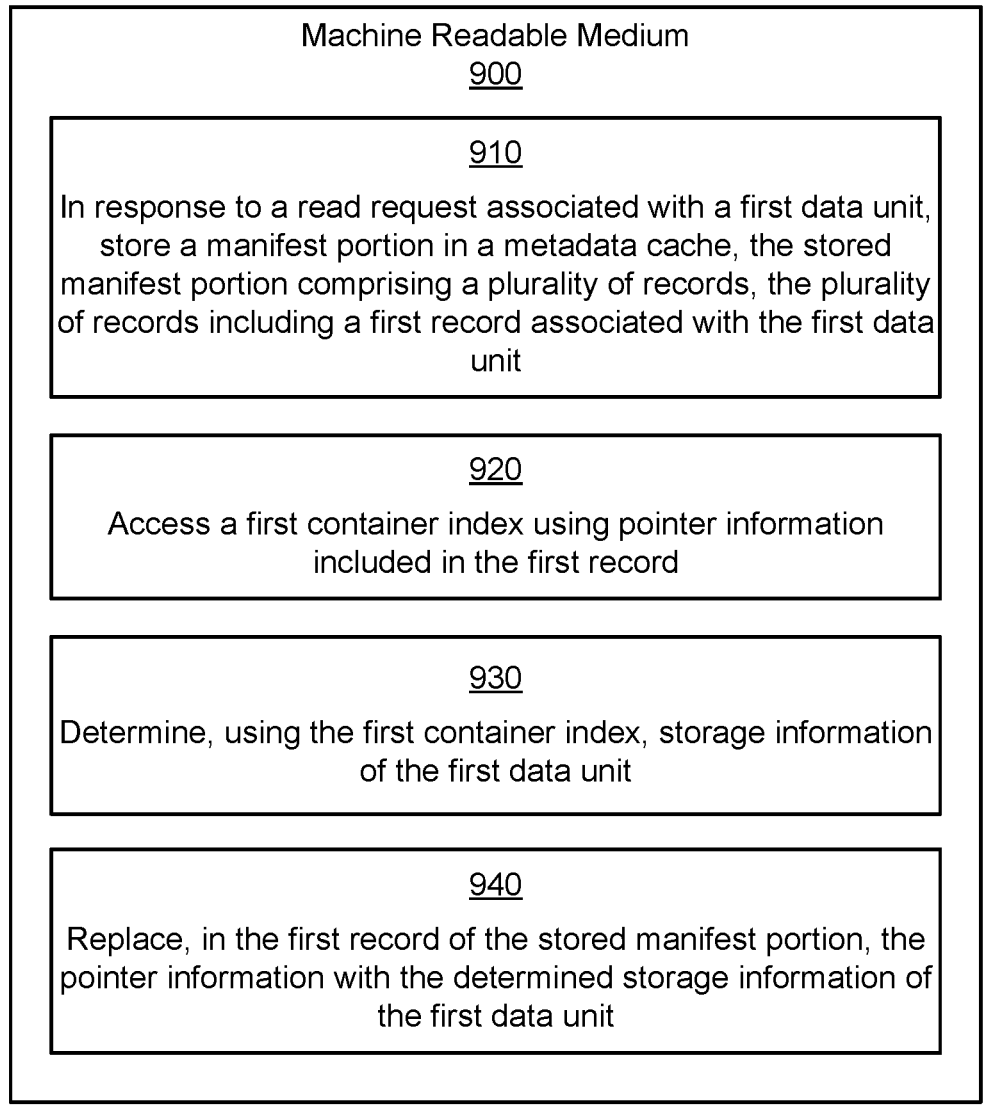
FIG. 9 is a diagram of an example machine-readable medium storing instructions in accordance with some implementations.

FIG. 9 shows a machine-readable medium 900 storing instructions 910-940, in accordance with some implementations. The instructions 910-940 can be executed by a single processor, multiple processors, a single processing engine, multiple processing engines, and so forth. The machine-readable medium 900 may be a non-transitory storage medium, such as an optical, semiconductor, or magnetic storage medium.

Instruction 910 may be executed to, in response to a read request associated with a first data unit, store a manifest portion in a metadata cache, the stored manifest portion comprising a plurality of records, the plurality of records including a first record associated with the first data unit. Instruction 920 may be executed to access a first container index using pointer information included in the first record. Instruction 930 may be executed to determine, using the first container index, storage information of the first data unit. Instruction 940 may be executed to replace, in the first record of the stored manifest portion, the pointer information with the storage information of the first data unit.

Figure 10:
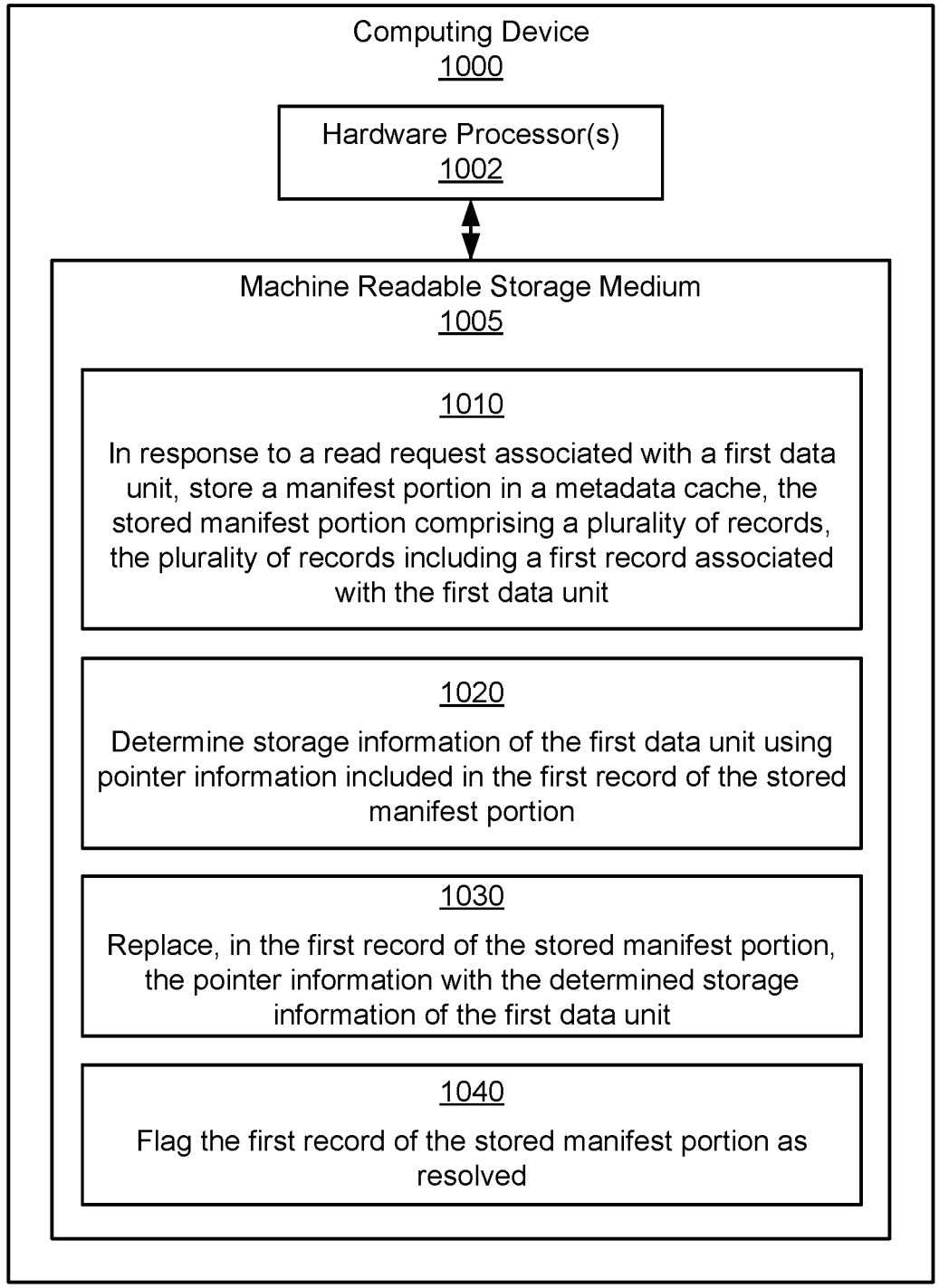
FIG. 10 is a schematic diagram of an example computing device, in accordance with some implementations.

FIG. 10 shows a schematic diagram of an example computing device 1000. In some examples, the computing device 1000 may correspond generally to some or all of the storage system 100 (shown in FIG. 1). As shown, the computing device 1000 may include hardware processor 1002 and machine-readable storage 1005 including instruction 1010-1040. The machine-readable storage 1005 may be a non-transitory medium. The instructions 1010-1040 may be executed by the hardware processor 1002, or by a processing engine included in hardware processor 1002.

Instruction 1010 may be executed to, in response to a read request associated with a first data unit, store a manifest portion in a metadata cache, the stored manifest portion comprising a plurality of records, the plurality of records including a first record associated with the first data unit. Instruction 1020 may be executed to determine storage information of the first data unit using pointer information included in the first record of the stored manifest portion. Instruction 1030 may be executed to replace, in the first record of the stored manifest portion, the pointer information with the storage information of the first data unit. Instruction 1040 may be executed to flag the first record of the stored manifest portion as resolved.

In accordance with implementations described herein, a storage system may cache a manifest portion including a plurality of records. The storage system may use pointer information included in a manifest record to identify an index associated with a data unit, and may read storage information of the data unit from the identified index. The storage system may replace the pointer information of the manifest record with the storage information of the data unit, and may thereby resolve the manifest record to include all information needed to access the data unit during subsequent reads. Further, during subsequent read operations of other data units, the storage system may opportunistically resolve other records of the cached manifest portion. Accordingly, implementations described herein may allow reading data using a resolved manifest portion, and may thereby provide improved performance of the deduplication system while using a limited amount of cache memory.

Note that, while FIGS. 1-10 show various examples, implementations are not limited in this regard. For example, referring to FIG. 1, it is contemplated that the storage system 100 may include additional devices and/or components, fewer components, different components, different arrangements, and so forth. In another example, it is contemplated that the functionality of the storage controller 110 described above may be included in any another engine or software of storage system 100. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computer implemented method, comprising:
  receiving, by a storage controller, a read request associated with a first data unit;
  in response to receiving the read request, the storage controller storing a manifest portion in a metadata cache, the stored manifest portion comprising a plurality of records, the plurality of records including a first record associated with the first data unit;
  determining, by the storage controller, storage information of the first data unit using pointer information included in the first record of the stored manifest portion; and
  replacing, by the storage controller, the pointer information in the first record with the determined storage information of the first data unit, wherein the storage information of the first data unit comprises:
    a unit offset field of a first container index;
    an entity offset field of the first container index;
    a stored length field of the first container index;
    a decompressed length field of the first container index; and
    a checksum field of the first container index.

2. The computer implemented method of claim 1, comprising:
  flagging the first record of the stored manifest portion as resolved;
  reading the first data unit using the determined storage information; and
  providing the first data unit as a result of the read request.

3. The computer implemented method of claim 2, wherein other records of the plurality of records are unresolved in the stored manifest portion.

4. The computer implemented method of claim 1, comprising:
  receiving a second read request for a second data unit, wherein the second data unit is associated with a second record of the stored manifest portion;
  determining storage information of the second data unit using second pointer information included in the second record of the stored manifest portion; and
  replacing, in the second record, the second pointer information with the determined storage information of the second data unit.

5. The computer implemented method of claim 4, comprising:
  receiving a third read request for a third data unit, wherein the third data unit is associated with a third record of a second manifest portion;
  determining storage information of the third data unit using third pointer information included in the third record of the second manifest portion; and
  replacing, in the third record of the second manifest portion, the third pointer information with the determined storage information of the third data unit.

6. The computer implemented method of claim 5, comprising:
  determining a fourth record of the stored manifest portion that also includes the third pointer information, wherein the fourth record is unresolved; and
  replacing, in the fourth record of the stored manifest portion, the third pointer information with the determined storage information of the third data unit.

7. The computer implemented method of claim 1, wherein determining the storage information of the first data unit using pointer information included in the first record comprises:
  accessing the first container index based on the first pointer information included in the first record; and
  reading the storage information of the first data unit from the first container index.

8. The computer implemented method of claim 1, comprising:
  determining a count of sequential reads over a time period;
  determining a count of random reads over the time period; and
  switching a cache memory between a sequential operating mode and a random operating mode based on the determined counts, wherein the sequential operating mode includes storing unmodified manifest portions in the cache memory, and wherein the random operating mode includes storing only resolved manifest portions in the cache memory.

9. The computer implemented method of claim 1, wherein the manifest portion stored in the metadata cache with pointer information in the first record replaced with the determined storage information of the first data unit is a resolved manifest portion in which the first record is resolved.

10. A non-transitory machine-readable storage medium comprising instructions executable by at least one processor to:
  in response to a read request associated with a first data unit, store a manifest portion in a metadata cache, the stored manifest portion comprising a plurality of records, the plurality of records including a first record associated with the first data unit;
  access a first container index using pointer information included in the first record;
  determine, using the first container index, storage information of the first data unit; and
  replace, in the first record of the stored manifest portion, the pointer information with the determined storage information of the first data unit, wherein the storage information of the first data unit comprises:

a unit offset field of the first container index;
an entity offset field of the first container index;
a stored length field of the first container index;
a decompressed length field of the first container index; and
a checksum field of the first container index.

11. The non-transitory machine-readable storage medium of claim 10, wherein the instructions are executable by the at least one processor to:
flag the first record of the stored manifest portion as resolved;
read the first data unit using the determined storage information; and
provide the first data unit as a result of the read request.

12. The non-transitory machine-readable storage medium of claim 10, wherein the instructions are executable by the at least one processor to:
receive a second read request for a second data unit, wherein the second data unit is associated with a second record of the stored manifest portion;
determine storage information of the second data unit using second pointer information included in the second record of the stored manifest portion; and
replace, in the second record, the second pointer information with the determined storage information of the second data unit.

13. The non-transitory machine-readable storage medium of claim 10, wherein the instructions are executable by the at least one processor to:
access the first container index based on the first pointer information included in the first record; and
read the storage information of the first data unit from the first container index.

14. The non-transitory machine-readable storage medium of claim 10, wherein the pointer information includes:
a container index field of the first record; and
a unit address field of the first record.

15. A storage system comprising:
at least one processor; and
a machine-readable storage medium comprising instructions executable by the at least one processor to:
in response to a read request associated with a first data unit, store a manifest portion in a metadata cache, the stored manifest portion comprising a plurality of records, the plurality of records including a first record associated with the first data unit;
determine storage information of the first data unit using pointer information included in the first record of the stored manifest portion;
replace, in the first record of the stored manifest portion, the pointer information with the determined storage information of the first data unit; and
flag the first record of the stored manifest portion as resolved, wherein the storage information of the first data unit comprises:
a unit offset field of a first container index;
an entity offset field of the first container index;
a stored length field of the first container index;
a decompressed length field of the first container index; and
a checksum field of the first container index.

16. The storage system of claim 15, wherein the instructions are executable by the at least one processor to:
read the first data unit using the determined storage information; and
provide the first data unit as a result of the read request.

17. The storage system of claim 15, wherein the instructions are executable by the at least one processor to:
receive a second read request for a second data unit, wherein the second data unit is associated with a second record of the stored manifest portion;
determine storage information of the second data unit using second pointer information included in the second record of the stored manifest portion; and
replace, in the second record, the second pointer information with the determined storage information of the second data unit.

18. The storage system of claim 15, wherein the instructions are executable by the at least one processor to:
determine a count of sequential reads over a time period;
determine a count of random reads over the time period; and
switch a cache memory between a sequential operating mode and a random operating mode based on the determined counts, wherein the sequential operating mode includes storing unmodified manifest portions in the cache memory, and wherein the random operating mode includes storing only resolved manifest portions in the cache memory.

19. The storage system of claim 15, wherein the instructions to determine the storage information of the first data unit comprise instructions executable by the at least one processor to:
access the first container index based on the first pointer information included in the first record; and
read the storage information of the first data unit from the first container index.

20. The storage system of claim 15, wherein the pointer information includes:
a container index field of the first record; and
a unit address field of the first record.

* * * * *